June 25, 1957  H. E. MELTZER  2,796,715
GRASS TRIMMER
Filed Oct. 20, 1954
2 Sheets-Sheet 1
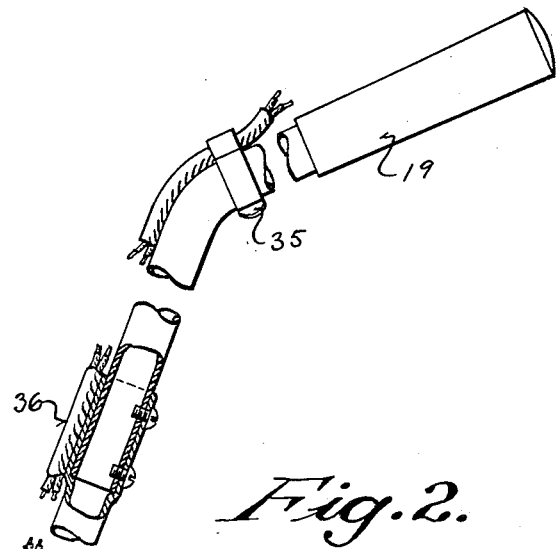
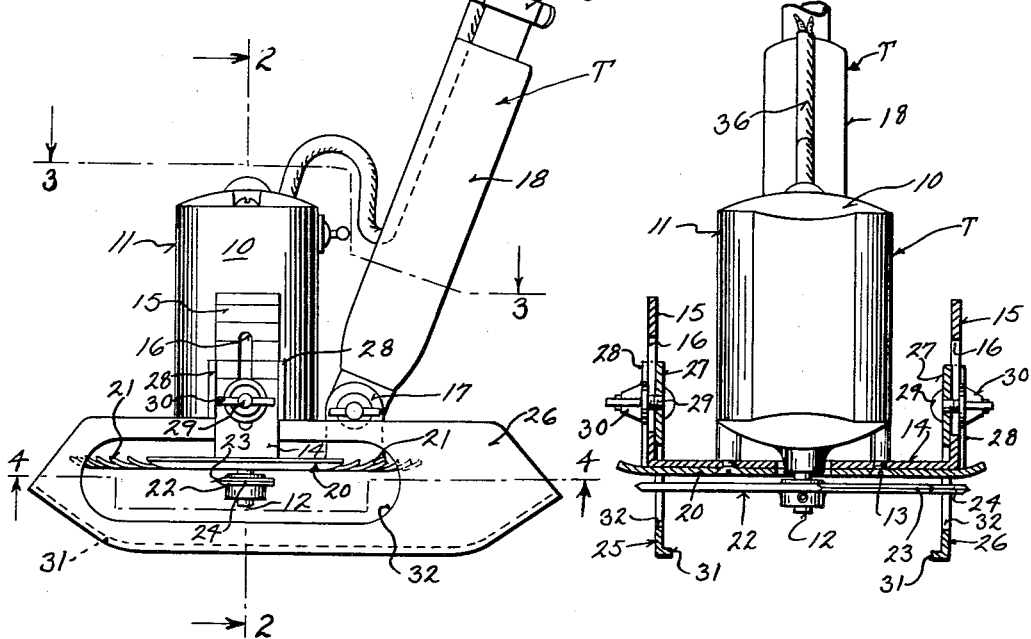
INVENTOR
HENRY E. MELTZER
BY
ATTORNEYS June 25, 1957 H. E. MELTZER 2,796,715
GRASS TRIMMER
Filed Oct. 20, 1954 2 Sheets-Sheet 2
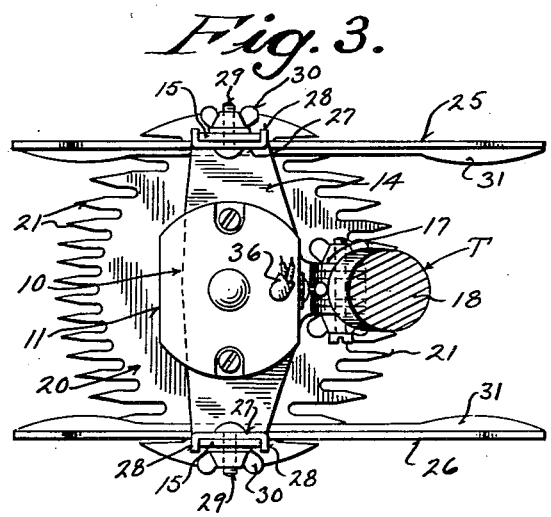
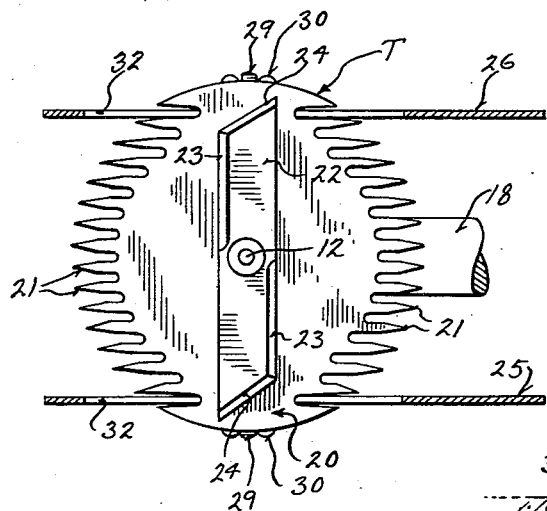
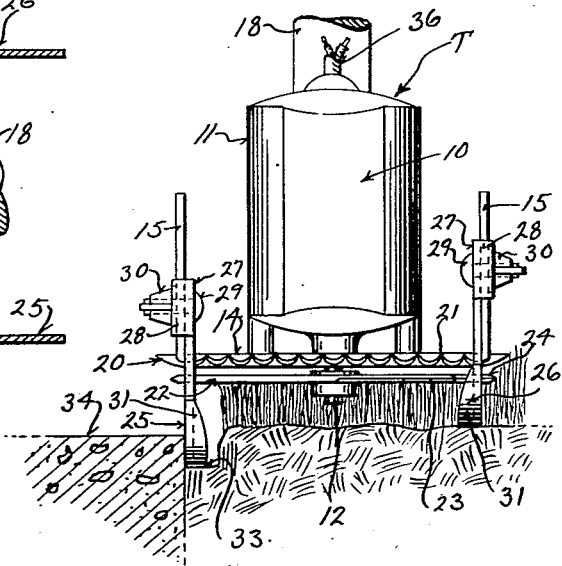
INVENTOR
HENRY E. MELTZER
BY
ATTORNEYS

United States Patent Office 2,796,715
Patented June 25, 1957

2,796,715

GRASS TRIMMER

Henry E. Meltzer, Racine, Wis., assignor to Allover Mfg. Co., Racine, Wis., a corporation Application October 20, 1954, Serial No. 463,497

3 Claims. (Cl. 56—25.4)

This invention appertains to a grass edger and trimmer and more particularly to a light, portable implement having a motor driven rotary blade for effectively keeping a lawn in a neat and attractive condition.

One of the primary objects of my invention is to provide a lawn trimmer and edger which will be easy to manipulate and which in effect will be self-cleaning, whereby the clogging up thereof by debris and plant juices will be lessened or entirely eliminated.

Another salient object of my invention is the provision of a novel top guard plate for the rotary blade having front and rear guard fingers slightly curved at their outer terminals, the construction being such as to permit the device to be readily moved back and forth over the lawn.

A still further object of my invention is the provision of a lawn trimmer and edger embodying a single guard plate for the rotary cutter and novelly arranged side guard plates or runners for the trimmer during the movement thereof over a lawn, the side guard plates or runners being of an open construction so that debris and plant juices will be thrown outward and away from the trimmer.

A further important object of my invention is to provide a novel means for mounting the side guard plates or runners on the body of the trimmer, whereby the same can be raised or lowered to position the rotary cutter at an exact desired distance relative to the lawn to be cut.

A still further object of my invention is the provision of means whereby the side guard plates or runners can be adjusted independently of one another, so that during the use of the device for edging or trimming a lawn close to a sidewalk or the like, one runner can be set to ride in the groove or trough in the lawn adjacent to the walk and the other runner can be set directly on the lawn.

A still further object of my invention is to provide a rotary lawn trimmer of the above character which will be of an exceptionally durable construction and one which can be placed on the market at a reasonable cost.

With these and other objects in view, the invention consists in the novel construction, arrangement and formation of parts as will be hereinafter more specifically described and claimed and illustrated in the accompanying drawings in which drawings, Figure 1 is a side elevational view of my improved grass edger and trimmer, parts of the view being shown broken away and in section to illustrate structural detail;

Figure 2 is a fragmentary vertical sectional view through the body of the trimmer taken on the line 2—2 of Figure 1, looking in the direction of the arrows;

Figure 3 is a horizontal sectional view taken through the device on the line 3—3 of Figure 1, looking in the direction of the arrows, showing the body of the trimmer in top plan;

Figure 4 is a horizontal sectional view taken on the line 4—4 of Figure 1, looking in the direction of the arrows, showing the novel guard plate and cutter blade in bottom plan, and Figure 5 is a fragmentary front elevational view showing my device being used for trimming the edge of the lawn alongside of a walk or the like.

Referring to the drawings in detail, wherein similar reference characters designate corresponding parts throughout the several views, the letter T generally indicates my novel grass trimmer and the same includes an electric motor 10 of the desired rating. The motor 10 includes a casing 11 and projecting outwardly from the lower end of the casing is the armature shaft 12. Rigidly secured to the casing 11 by depending bolts 13 is a transversely extending bracket plate 14. The ends of the plate extend a material distance beyond the opposite faces of the motor and the plate has formed thereon upstanding right angularly extending parallel arms 15. The arms are provided with longitudinally extending slots 16, for a purpose which will later appear. The central portion of the rear end of the cross-plate 14 has formed thereon socket arms 17 to which is adjustably secured a manipulating handle 18. The upper end of the handle is suitably curved and provided with a hand grip 19 so as to facilitate the handling of the implement. The handle 18 can be formed in various manners, such as from tubular stock and if desired the handle can be made adjustable as to length. While, I have shown the handle adjustably connected to the socket 17 for movement back and forth, it is to be also understood that this joint can be in the nature of a ball and socket so that the handle can be disposed at various other angles relative to the motor.

Rigidly fastened to the lower surface of the cross-plate 14 by the bolts 13 is my novel guard plate 20 and the sides of the plate project beyond the arms 15. The plate 20 can be, and preferably is of a disc shape in plan, and the front and rear edges of the plate are provided with guard cutter fingers 21. The fingers are preferably slightly curved upwardly at their forward ends so as to facilitate the entrance of grass between the teeth.

Disposed below the cutter guard plate 20 is the rotary cutter blade 22 and this blade is rigidly fastened to the armature shaft 12 for rotation therewith. By referring to Figure 4 it can be seen that the opposite longitudinal edges of the blade 22 are beveled to provide sharp cutters 23, and the terminals of the blade are angled and also provided with cutting edges 24. The blade is of such a length as to sweep under the teeth 21 during the rotation of the blade and the length of the blade is slightly less than the diameter of the plate so that the accidental cutting of an operator by the blade will be prevented.

Cooperating with the guard plate 20 are spaced parallel side guard plates or runners 25 and 26 and these plates are adjustably carried by the arms 15 of the cross bracket plate 14. The upper edges of the side guard runner plates have formed thereon vertically disposed guide arms 27 which fit flat against the inner surface of the bracket arms 15. The edges of the guide arms 27 have formed thereon guide flanges 28 which embrace the side edges of the bracket arms 15. The guide arms 27 carry bolts 29 which extend through the slots 16 in the bracket arms 15. Winged nuts 30 are threaded on the bolts 29 and by tightening and loosening the nuts, the guard plates 25 and 26 can be adjustably held in a desired position. The lower edges of the side plates or runners 25 and 26 are flanged inwardly to provide runner edges 31 for resting on the lawn. The side plates or runners are of such a length as to extend forwardly and rearwardly of the guard cutter plate 20 and the front and rear ends of these plates are tapered to form leading edges and thus facilitate the sliding of the entire implement over a surface. Forming an important part of the invention are the openings 32 formed in the side guard plates or runners 25 and 26 and the side edges of the guard cutter plate 20 project through these openings. Thus, in effect, the runners or side guard plates are of an open construction and hence debris will be thrown outward of the implement and will not collect within the implement and hence the clogging up thereof is prevented. Further, the openings 32 prevent the collection of plant juices on the inner faces of the runners or side guard plates, and thus the implement is kept at all times in a clean condition.

I lay great stress on the combination of the side guard plates or runners with the cutter guard plate 20, as by this construction I eliminate the use of top and bottom cutter guard plates and I am enabled to use only a single guard top plate. Hence, the collection of matter by the cutter guard plates is eliminated.

Under normal conditions the lower runner faces 31 of the trimmer are disposed in the same horizontal plane, but where the implement is used for the trimming of an edge of a lawn close to a sidewalk, one runner or side guard plate can be adjusted independently of the other so as to depend a greater distance below the blade 22 for riding in the groove or trough, which is usually formed in a lawn adjacent to a sidewalk. This is best shown in Figure 5 of the drawings and in this view, the groove or trough in the lawn is indicated by the reference character 33 and it can be seen that this groove is in close proximity to a sidewalk 34. As the outer faces of the side guard plates or runners 25 and 26 are of a flat, smooth structure, the runner riding in the groove or trough 33 can be placed in facial engagement with the sidewalk 34 and in this instance the runner forms an effective guide.

In view of the fact that the entire implement is of a light construction, the same can be also conveniently used for trimming shrubbery and the like.

The handle 18 at spaced points can be provided with clips 35 for supporting the electric cord 36 leading to the motor and thus this cord will be held out of the way during the use of the implement.

Changes in details may be made without departing from the spirit or the scope of this invention, but what I claim as new is:

1. A lawn trimmer and edger comprising an electric motor including a housing and an armature shaft extending beyond the lower end of the housing, a cross bracket plate secured to the housing, an adjustable manipulating handle carried by the cross bracket plate, a cutter guard plate carried by the cross bracket plate having guard cutter teeth thereon, a cutter blade cooperating with the guard plate and teeth and disposed below said plate and operatively connected to the armature shaft for rotation therewith, and side guard and runner plates arranged in spaced parallel relation projecting below the cutter guard plate and said blade carried by the cross bracket plate, said guard runners extending forwardly and rearwardly of the guard cutter plate and having inturned flanges on their lower edges defining runner faces.

2. A lawn trimmer and edger comprising an electric motor including a housing and an armature shaft extending beyond the lower end of the housing, a cross bracket plate secured to the housing having upstanding arms on its outer ends, a guard cutter plate secured to the bracket plate having guard cutter teeth, a blade for cooperating with said teeth disposed below the plate and carried by said armature shaft for rotation therewith, a manipulating handle secured to the bracket plate, and guard runner plates arranged in spaced parallel relation engaging the arms, said guard and runner plates extending below the guard cutter plate and blade, said guard runner plates having longitudinally extending openings therein through which the guard plate extends, each of said guard runner plates being independently adjustable on said arms, whereby said runner plates can be positioned with their lower edges in different horizontal planes.

3. A lawn trimmer and edger comprising a single cutter guard plate, a rotatable cutter disposed below the guard plate for cooperation therewith and having a diameter less than the diameter of the guard plate so that the blade will not extend beyond the plate, a motor carried by the guard plate including an armature shaft extending through the plate and operatively connected to the cutter, upstanding arms carried by the opposite sides of the guard plate, and spaced parallel side guard runner plates disposed on each side of the guard plate, means adjustably connecting each side guard runner plate with an arm for independently varying the lower edge of the side guard runner plates relative to the guard plate, said side guard runner plates extending below both the guard plate and the cutter, and a manipulating handle disposed between the side guard runner plates and secured to said guard plate.

References Cited in the file of this patent
UNITED STATES PATENTS

| | | |
|---|---|---|
| D. 172,275 | Gabbert et al. | May 25, 1954 |
| 2,149,463 | Orr | Mar. 7, 1939 |
| 2,242,524 | Hunt | May 20, 1941 |
| 2,617,189 | Brown | Nov. 11, 1952 |
| 2,672,002 | Nelson | Mar. 16, 1954 |